(12) United States Patent
Nijhawan et al.

(10) Patent No.: US 11,611,618 B2
(45) Date of Patent: Mar. 21, 2023

(54) ORCHESTRATING ALLOCATION OF SHARED RESOURCES IN A DATACENTER

(71) Applicant: Nutanix, Inc., San Jose, CA (US)

(72) Inventors: Aman Nijhawan, Seattle, WA (US); Anil Kumar Kushwah, Bengaluru (IN); Avi Bhandari, San Jose, CA (US); Jan Ralf Alexander Olderdissen, Herrenberg (DE)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/187,698

(22) Filed: Feb. 26, 2021

(65) Prior Publication Data
US 2022/0210226 A1 Jun. 30, 2022

Related U.S. Application Data

(63) Continuation-in-part of application No. 17/139,541, filed on Dec. 31, 2020.
(Continued)

(51) Int. Cl.
*H04L 67/1097* (2022.01)
*G06F 9/455* (2018.01)
(Continued)

(52) U.S. Cl.
CPC ...... *H04L 67/1097* (2013.01); *G06F 9/45541* (2013.01); *G06F 13/4027* (2013.01); *H04L 49/351* (2013.01); *H04L 49/354* (2013.01)

(58) Field of Classification Search
CPC . H04L 67/1097; H04L 49/354; H04L 49/351; G06F 9/45541; G06F 13/4027
See application file for complete search history.

(56) References Cited

U.S. PATENT DOCUMENTS

| | | |
|---|---|---|
| 7,843,907 B1 | 11/2010 | Abou-emara et al. |
| 7,990,994 B1 | 8/2011 | Yeh et al. |
| | (Continued) | |

FOREIGN PATENT DOCUMENTS

| | | |
|---|---|---|
| CN | 104935455 A | 9/2015 |
| EP | 3066795 A1 | 9/2016 |
| | (Continued) | |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Shean Tokuta
(74) *Attorney, Agent, or Firm* — Vista IP Law Group, LLP

(57) ABSTRACT

A cluster configuration request to form a hyperconverged computing infrastructure (HCI) cluster in a cloud computing environment is processed. Based on the cluster configuration request and any other cluster specifications, a plurality of bare metal computing nodes of the cloud computing environment are configured to operate as an HCI cluster. First, a tenant-specific secure network overlay is formed on a first set of tenant-specific networking hardware resources. Then, the tenant-specific secure network overlay is used by an orchestrator to provision a second set of tenant-specific networking hardware resources. The second set of tenant-specific networking hardware resources are configured to interconnect node-local storage devices into a shared storage pool having a contiguous address space. Top-of-rack switches are configured to form a network overlay on the first set of tenant-specific networking hardware resources. Then, top-of-rack switches are configured to form a layer-2
(Continued)

subnet on the second set of tenant-specific networking hardware resources.

24 Claims, 11 Drawing Sheets

Related U.S. Application Data

(60) Provisional application No. 63/132,729, filed on Dec. 31, 2020.

(51) Int. Cl.
*H04L 49/354* (2022.01)
*H04L 49/351* (2022.01)
*G06F 13/40* (2006.01)

(56) References Cited

U.S. PATENT DOCUMENTS

| | | | |
|---|---|---|---|
| 8,195,760 | B2 | 6/2012 | Lacapra et al. |
| 8,200,700 | B2 | 6/2012 | Moore et al. |
| 8,345,692 | B2 | 1/2013 | Smith |
| 8,347,088 | B2 | 1/2013 | Moore et al. |
| 8,549,518 | B1 | 10/2013 | Aron et al. |
| 8,601,473 | B1 | 12/2013 | Aron et al. |
| 8,713,295 | B2 | 4/2014 | Bax et al. |
| 8,743,872 | B2 | 6/2014 | Chidambaram et al. |
| 8,850,130 | B1 | 9/2014 | Aron et al. |
| 9,087,319 | B2 | 7/2015 | Nguyen |
| 9,141,625 | B1 | 9/2015 | Thornewell et al. |
| 9,354,912 | B1 | 5/2016 | Aron et al. |
| 9,652,265 | B1 | 5/2017 | Narayanasamy et al. |
| 9,712,486 | B2 | 7/2017 | Johnson et al. |
| 9,772,866 | B1 | 9/2017 | Aron et al. |
| 9,813,303 | B1* | 11/2017 | Guigli ................ H04L 67/10 |
| 10,210,567 | B2 | 2/2019 | Mick et al. |
| 10,268,593 | B1 | 4/2019 | Olson et al. |
| 10,447,806 | B1 | 10/2019 | Sahay et al. |
| 10,637,724 | B2 | 4/2020 | Johnson et al. |
| 10,637,916 | B2 | 4/2020 | Ding |
| 10,902,062 | B1 | 1/2021 | Guha et al. |
| 10,921,991 | B1 | 2/2021 | Olson et al. |
| 11,196,591 | B2 | 12/2021 | Hira et al. |
| 2005/0257072 | A1 | 11/2005 | Cross et al. |
| 2010/0077158 | A1 | 3/2010 | Asano |
| 2010/0191779 | A1 | 7/2010 | Hinrichs |
| 2011/0282975 | A1 | 11/2011 | Carter |
| 2012/0233668 | A1 | 9/2012 | Leafe et al. |
| 2013/0104251 | A1 | 4/2013 | Moore et al. |
| 2013/0205028 | A1 | 8/2013 | Crockett et al. |
| 2013/0238785 | A1 | 9/2013 | Hawk et al. |
| 2014/0025816 | A1* | 1/2014 | Otani ................ H04L 61/103 709/225 |
| 2014/0222917 | A1 | 8/2014 | Poirier |
| 2014/0337500 | A1 | 11/2014 | Lee |
| 2015/0120887 | A1 | 4/2015 | Hu et al. |
| 2016/0216909 | A1 | 7/2016 | Provenzano et al. |
| 2016/0218947 | A1 | 7/2016 | Hughes et al. |
| 2016/0218991 | A1* | 7/2016 | Sharabi ............. G06F 9/45558 |
| 2016/0248732 | A1 | 8/2016 | Kolesnik et al. |
| 2016/0285970 | A1 | 9/2016 | Cai et al. |
| 2016/0337272 | A1* | 11/2016 | Berman ............. H04L 49/70 |
| 2016/0352735 | A1 | 12/2016 | Zou et al. |
| 2016/0357642 | A1 | 12/2016 | Burshan et al. |
| 2017/0093790 | A1 | 3/2017 | Banerjee et al. |
| 2017/0163475 | A1 | 6/2017 | Olson |
| 2017/0171019 | A1* | 6/2017 | Nayak .............. H04L 41/0803 |
| 2018/0011874 | A1 | 1/2018 | Lacapra et al. |
| 2018/0049043 | A1 | 2/2018 | Hoffberg et al. |
| 2018/0351851 | A1 | 12/2018 | Parthasarathy |
| 2019/0097900 | A1 | 3/2019 | Rodriguez et al. |
| 2019/0158353 | A1 | 5/2019 | Johnson et al. |
| 2019/0166192 | A1 | 5/2019 | Ding |
| 2019/0212944 | A1 | 7/2019 | Hutchison et al. |
| 2019/0243687 | A1 | 8/2019 | Chen |
| 2019/0268421 | A1 | 8/2019 | Markuze et al. |
| 2019/0332575 | A1 | 10/2019 | Aron et al. |
| 2019/0349426 | A1 | 11/2019 | Smith et al. |
| 2020/0026579 | A1 | 1/2020 | Bahramshahry et al. |
| 2020/0125690 | A1 | 4/2020 | Kim |
| 2020/0134479 | A1* | 4/2020 | Parthasarathy ........ G06F 16/252 |
| 2020/0175854 | A1 | 6/2020 | Dousse et al. |
| 2020/0177452 | A1 | 6/2020 | Schardt et al. |
| 2020/0225924 | A1 | 7/2020 | Sathyanarayanamurthy et al. |
| 2020/0225925 | A1 | 7/2020 | Sathyanarayanamurthy et al. |
| 2020/0250153 | A1* | 8/2020 | Krivenok ............. G06F 16/214 |
| 2020/0280492 | A1* | 9/2020 | Devireddy ............ H04L 67/34 |
| 2020/0344296 | A1* | 10/2020 | Jain .................. H04L 12/4633 |
| 2020/0394071 | A1* | 12/2020 | Panse ................. G06F 9/5011 |
| 2020/0401457 | A1* | 12/2020 | Singhal ................. G06F 9/445 |
| 2021/0311760 | A1* | 10/2021 | Oki .................. H04L 47/803 |
| 2021/0334004 | A1* | 10/2021 | Krivenok ............. G06F 3/0629 |

FOREIGN PATENT DOCUMENTS

| | | | |
|---|---|---|---|
| EP | 3731461 A1 * | 10/2020 | ........ H04L 41/0816 |
| WO | WO 2005106659 | 11/2005 | |
| WO | WO 2014041394 | 3/2014 | |
| WO | WO 2022019930 | 1/2022 | |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Poitras, Steven. "The Nutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Cano, I. et al., "Curator: Self-Managing Storage for Enterprise Clusters", 14th USENIX Symposium on Networked Systems Design and Implementation, NSDI '17, (Mar. 27, 2017).
"A Simple, Scalable Way to Extend Your Connectivity Reach Across Data Centers," Equinix, copyright 2019.

(56) References Cited

OTHER PUBLICATIONS

Bowker, M., "Interconnection Amplifies the Value of Bare Metal Deployments," ESG White Paper, The Enterprise Strategy Group, Inc., dated Oct. 2020.

"Building Stateless/Diskless Images," IBM Corporation, date found via Internet Archive as Sep. 14, 2016, URL: https://xcat-docs.readthedocs.io/en/stable/advanced/mixed_cluster/building_stateless_images.html.

"Node images," Google Cloud, date found via Internet Archives are Jul. 18, 2021, URL: https://cloud.google.com/kubernetes-engine/docs/concepts/node-images.

"Specifying a node image," Google Cloud, date found via Internet Archives as Aug. 16, 2021, URL: https://cloud.google.com/kubernetes-engine/docs/how-to/node-images.

Vallée, G., et al., "SSI-OSCAR: a Cluster Distribution for High Performance Computing Using a Single System Image," Proceedings of the 19th International Symposium on High Performance Computing Systems and Applications, copyright 2005.

"Bigstep Metal Cloud vs AWS", Bigstep, date found via Internet Archive as Feb. 14, 2020, URL: https://bigstep.com//bigstep-vs-aws.

"Metal Cloud Distributed MicroSAN Storage," Bigstep, date found via Internet Archive as Feb. 14, 2020, URL: https://bigstep.com//distributed-storage.

"Looking for an alternative to Dedicated Servers?," Bigstep, date found via Internet Archive as Jul. 27, 2020, URL: https://bigstep.com//bigstep-vs-dedicated-servers.

"Bigstep Container Service," Bigstep, date found via Internet Archive as Feb. 14, 2020, URL: https://bigstep.com//products/bigstep-container-service.

"An Infrastructure as a Service Serious Wordbook," Bigstep, dated Apr. 3, 2019, URL: https://bigstep.com/blog/an-infrastructure-as-a-service-serious-wordbook.

Lim, E., et al., "Self-provisioning and configuration system for heterogeneous diskless cluster system," IEEE, dated 2015.

"Bigstep delivers giant leap in performance with Full Metal Cloud," Hewlett Packard Enterprise, date found via Google as Feb. 15, 2016.

Pintoiu, C., "MongoDB vs DocumentDB," BigStep, date found via Google as Apr. 1, 2019.

Non-Final Office Action dated May 12, 2022 for related U.S. Appl. No. 17/139,541.

Aviatrix Systems, "Aviatrix Transit Architecture for Azure", Aviatrix Docs, (Oct. 28, 2020), (Publication date based on indicated capture date by Archive.org; first publication date unknown).

Aviatrix Systems, "Aviatrix Next Gen Transit with customized SNAT and DNAT features", Aviatrix Docs, (Oct. 28, 2020), (Publication date based on indicated capture date by Archive.org; first publication date unknown).

Aviatrix Systems, "Gateway", Aviatrix Docs, (Oct. 28, 2020), (Publication date based on indicated capture date by Archive.org; first publication date unknown).

VMware, "Deploy the NSX Public Cloud Gateway", VMware Docs, (Jun. 19, 2020).

VMware, "Azure VMware Solution Planning and Deployment Guide", (Sep. 1, 2021), (Publication date based on indicated capture date by Archive.org; first publication date unknown).

Chebaro, S. "Step By Step Deploy VMware NSX with Microsoft Azure IPSEC VPN Site-to-Site", Zero to Hero, (Mar. 17, 2017).

IBM, "Planning for Bare Metal Servers on VPC", IBM Cloud Docs, (Last updated Jan. 21, 2022).

IBM, "VMware NSX-T logical routers on VPC deployments", IBM Cloud Docs, (Last updated Jun. 21, 2022).

Google, "Private access options for services", Google Cloud, (Last updated Nov. 16, 2020).

Google, "Private Google Access", Google Cloud, (Last updated May 12, 2021).

Hosken, M et al., "Data Center Modernization with VMware Cloud on AWS", VMware, First edition, (Sep. 2019).

AWS, "Example routing options", Amazon Virtual Private Cloud, user guide, (Oct. 26, 2020), (Publication date based on indicated capture date by Archive.org; first publication date unknown).

AWS, "How transit gateways work", Amazon Virtual Private Cloud, (Oct. 24, 2020), (Publication date based on indicated capture date by Archive.org; first publication date unknown).

AWS, "Transit VPC Solution", AWS Whitepaper, (Feb. 7, 2021), (Publication date based on indicated capture date by Archive.org; first publication date unknown).

\* cited by examiner

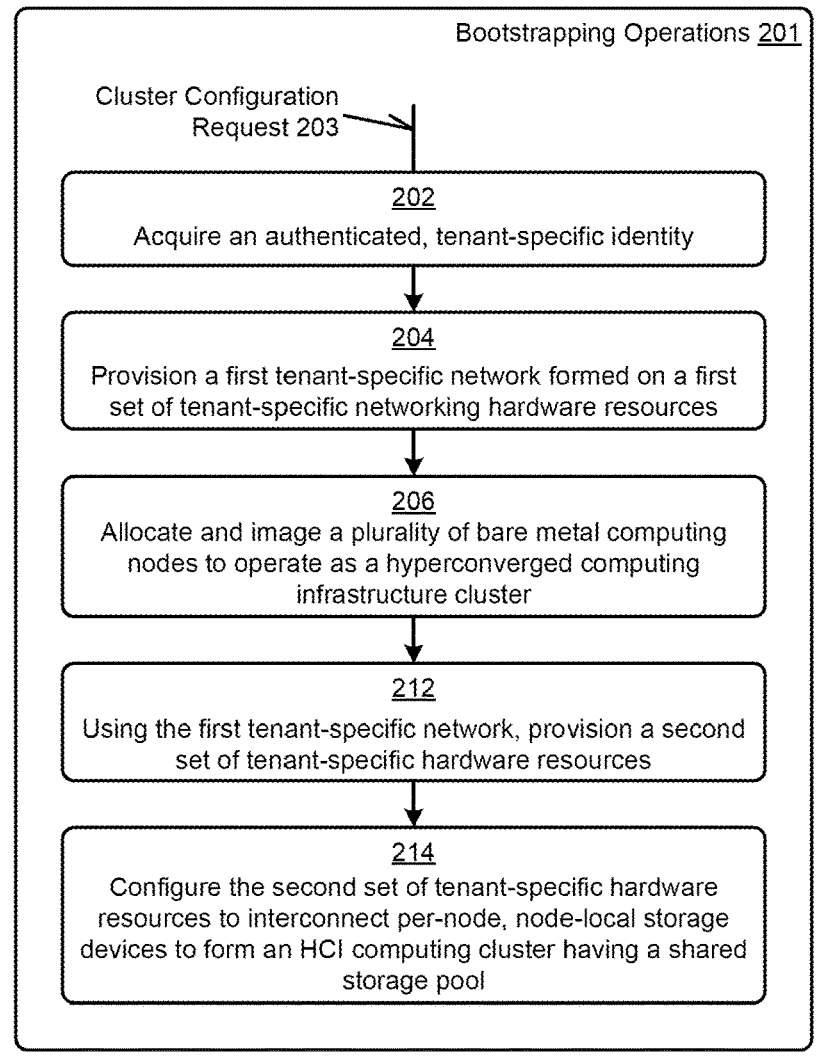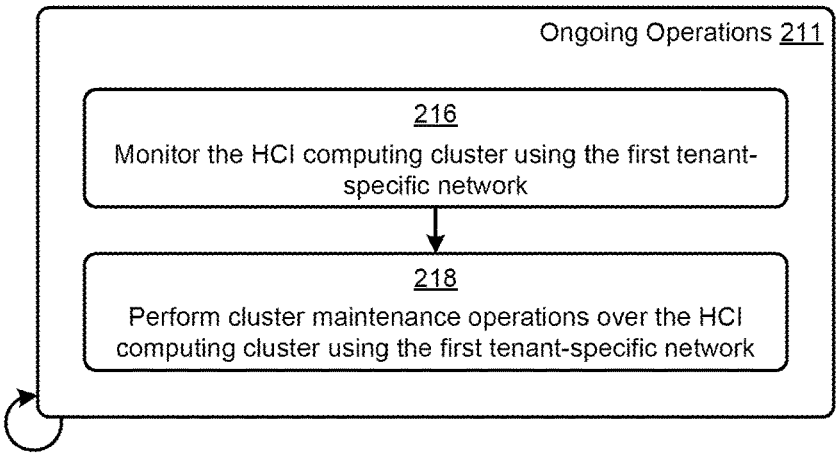
FIG. 2

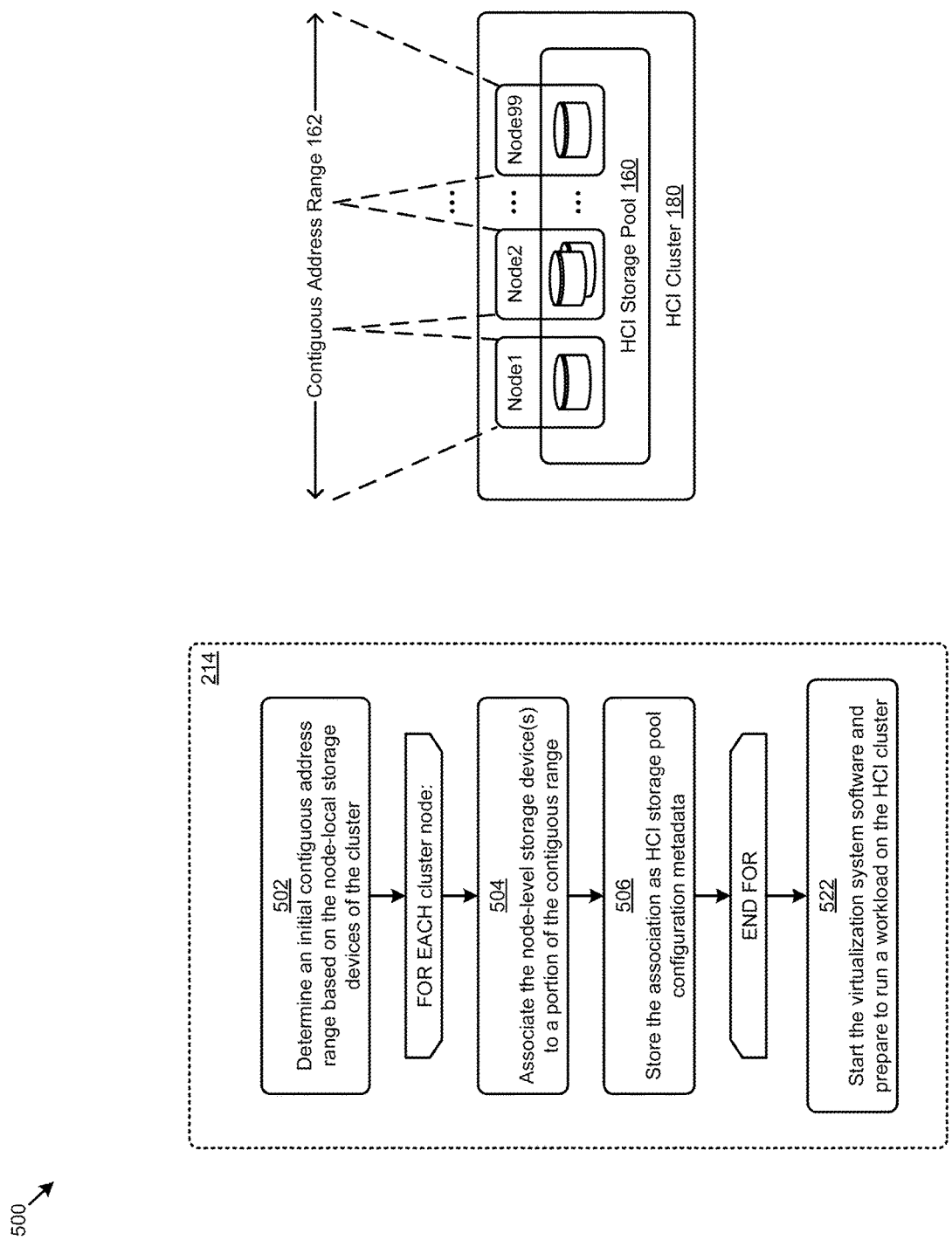

ORCHESTRATING ALLOCATION OF SHARED RESOURCES IN A DATACENTER

The present application is a continuation-in-part, and claims the benefit of priority to co-pending U.S. patent application Ser. No. 17/139,541 titled "CONFIGURING VIRTUALIZATION SYSTEM IMAGES FOR A COMPUTING CLUSTER" filed on Dec. 31, 2020, which is hereby incorporated by reference in its entirety; and the present application claims the benefit of priority to U.S. Patent Application Ser. No. 63/132,729 titled "ORCHESTRATING ALLOCATION OF SHARED RESOURCES IN A DATACENTER" filed on Dec. 31, 2020, which is hereby incorporated by reference in its entirety.

TECHNICAL FIELD

This disclosure relates to techniques for hyperconverged cluster configuration, and more particularly to techniques for secure, tenant-specific allocation of shared resources that form a storage pool.

BACKGROUND

For providing a hyperconverged computing infrastructure (HCI) deployment with a secure storage pool in a cloud, physical infrastructure need to be allocate allocated in the datacenters that comprise the cloud. More specifically, infrastructure allocation needs to be performed in a secure manner so as to provide isolated infrastructure to each tenant. This security requirement applies to physical entities such as hyperconverged computing infrastructure (HCI) nodes, compute-only (CO) nodes, storage-only nodes, IP addresses on the underlay, VLANs, VxLANs, etc. This security requirement also applies to software entities such as cluster configuration modules, monitoring and management modules, definitions of overlay networks, etc. Moreover, allocated infrastructure needs to be provisioned with a secure, authenticated, per-tenant identity in order for additional services to be able to be trusted as belonging to the authenticated tenant.

When configuring a tenant-specific HCI computing cluster in a cloud setting, physical infrastructure needs to be allocated on a per-tenant basis so as to provide secure/isolated infrastructure to each tenant. Such secure/isolated infrastructure includes physical entities such as bare-metal nodes, as well as logical entities such as IP addresses, VLANs, VxLANs, etc. More particularly, such allocated infrastructure and logical entities need to be provisioned with per-tenant isolation from the very beginning of the provisioning. This situation becomes more complicated by the fact that an HCI computing cluster implements a shared storage pool that is formed of many individual node-local storage devices that are interconnected over a common network.

Unfortunately, this sets up a chicken-and-egg problem where the per-tenant allocated networking infrastructure that underlies the shared storage pool must be a trusted network before configuring the storage pool, while at the same time, the configuration software that runs to form the shared storage pool must be loaded onto the node-local storage devices that form the storage pool.

Therefore, what is needed is a technique or techniques that address technical problems associated with securely configuring an HCI shared storage pool of an HCI cluster in a multi-tenant datacenter setting.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for orchestrating allocation of shared resources in a datacenter, which techniques advance the relevant technologies to address technological issues with legacy approaches. More specifically, the present disclosure describes techniques used in systems, methods, and in computer program products for allocating per-tenant secure physical infrastructure from a pool of shared resources of a datacenter. Certain embodiments are directed to technological solutions for provisioning a secure overlay (e.g., a secure VxLAN, a secure virtual local area network, etc.) before allocating infrastructure that forms the HCI cluster.

The disclosed embodiments modify and improve over legacy approaches. In particular, the herein-disclosed techniques provide technical solutions that address the herein-described technical problems. Such technical solutions involve specific implementations (i.e., data organization, data communication paths, module-to-module interrelationships, etc.) that relate to the software arts for improving computer functionality.

The herein-disclosed embodiments for provisioning a secure overlay (e.g., secure VxLAN, secure virtual local area network, etc.) before allocating infrastructure that forms the HCI cluster involve technological solutions pertaining to technological problems that arise in the hardware and software arts that underlie cloud computing settings. Aspects of the present disclosure achieve performance and other improvements in peripheral technical fields including, but not limited to, hyperconverged computing platform management and cloud computing datacenters.

Some embodiments include a sequence of instructions that are stored on a non-transitory computer readable medium. Such a sequence of instructions, when stored in memory and executed by one or more processors causes the one or more processors to perform a set of acts for provisioning a secure overlay (e.g., secure VxLAN, secure virtual local area network, etc.) before allocating infrastructure that forms an HCI cluster.

Some embodiments include the aforementioned sequence of instructions that are stored in a memory, which memory is interfaced to one or more processors such that the one or more processors can execute the sequence of instructions to cause the one or more processors to implement acts for provisioning a secure overlay before allocating infrastructure that forms an HCI cluster.

In various embodiments, any combination of any of the above can be combined to perform any variation of acts for allocating per-tenant secure physical infrastructure from a pool of shared resources of a datacenter, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 2 presents operation flows that facilitate allocation, bootstrapping and ongoing management of tenant-isolated, secure physical infrastructure that implements an HCI computing cluster formed from a pool of shared resources, according to an embodiment.

FIG. 5 presents a series of operations that facilitate provisioning of an HCI storage pool from node-local storage components, according to an embodiment.

DETAILED DESCRIPTION

Figure 1A:
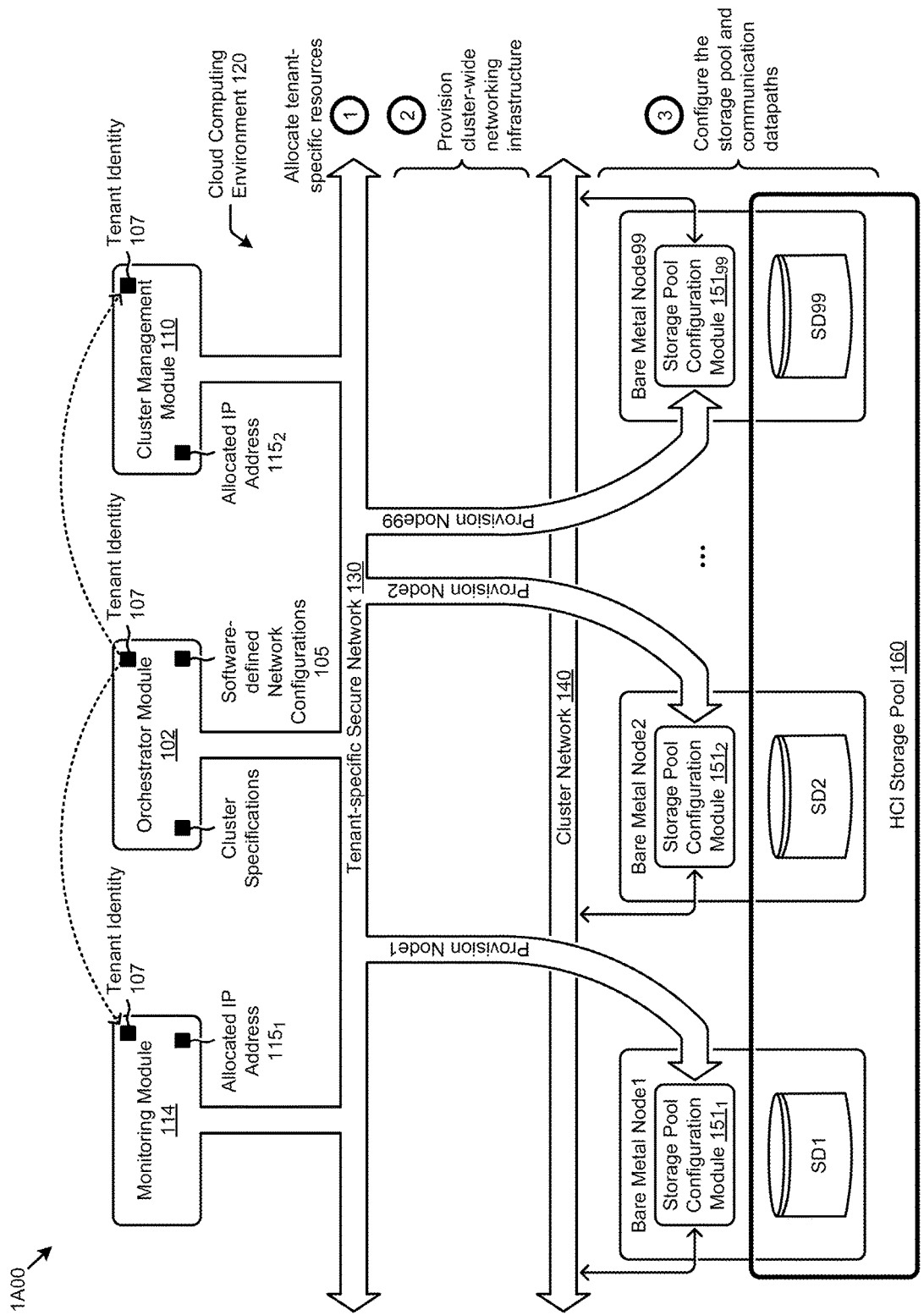
FIG. 1A depicts a multi-tenant datacenter in which techniques for allocating per-tenant secure physical infrastructure from a pool of shared resources can be practiced, according to an embodiment.

Aspects of the present disclosure solve problems associated with using computer systems for securely configuring an HCI shared storage pool of an HCI cluster in a multi-tenant datacenter setting. These problems are unique to computer-implemented methods for configuring an HCI shared storage pool of an HCI cluster in a multi-tenant datacenter setting in the context of cloud computing settings. Some embodiments are directed to approaches for provisioning a secure overlay before configuring the infrastructure that forms the HCI cluster. The accompanying figures and discussions herein present example environments, systems, methods, and computer program products.

Overview

An orchestrator service securely provisions an HCI cluster and its shared storage pool in a datacenter. The orchestrator does so by first provisioning an isolated network for a particular tenant using a secure network overlay (e.g., secure VxLAN, secure virtual local area network, etc.) that is formed on tenant-specific and tenant-isolated networking infrastructure. The orchestrator then provisions additional tenant-specific hardware resources (e.g., networking resources and bare-metal node resources) using this first isolated secure network overlay. The orchestrator allocates a tenant-isolated networking infrastructure as well as an internet protocol (IP) address pool that is composed of IP addresses that are non-overlapping between tenants of the datacenter. The orchestrator further configures per-tenant firewalls to secure the deployment.

An authenticated, tenant-unique identity is provisioned to nodes of the HCI cluster, and a monitoring and management facility belonging to the authenticated tenant is brought up on tenant-isolated infrastructure. This authenticated, tenant-unique configuration allows tenant-specific resources to securely communicate with various services of the cloud environment. The foregoing allocation and configuration steps serve to bootstrap the HCI cluster and its shared storage pool in a secure, tenant-specific manner. The orchestrator can provision additional infrastructure and/or applications. For example, the orchestrator can provision a disaster recovery data path that is used by a tenant's virtual machines to communicate to a controller virtual machine (CVM), which in turn serves to manage accesses to and from the shared storage pool of the HCI cluster.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A depicts a multi-tenant datacenter in which techniques for allocating per-tenant secure physical infrastructure from a pool of shared resources can be practiced. As an option, one or more variations of multi-tenant datacenter 1A00 or any aspect thereof may be implemented in the context of the architecture and functionality of the embodiments described herein and/or in any alternative environments.

Using the operational elements shown, a shared storage pool formed from node-local storage devices can be securely configured for per-tenant isolation. The techniques operate in a cloud computing environment 120 that hosts allocatable bare metal computing nodes (e.g., bare metal node1, bare metal node2, . . . bare metal node99). The techniques disclosed herein operate to configure at least some of the plurality of bare metal computing nodes to operate as a hyperconverged computing infrastructure cluster. Specifically, an orchestrator module allocates bare metal nodes and other resources that are to be configured into an HCI cluster that is specific to a particular tenant (operation 1). Software that runs on the bare metal nodes is imaged onto the bare metal nodes, and each of the imaged bare metal nodes are brought into a state of readiness to be configured into a cluster network 140 that is specifically configured for a particular tenant. In this and other embodiments, the cluster network 140 is at least partially configured by a bootstrapping node that communicates with the bare metal nodes over a tenant-specific secure network 130.

As shown in this embodiment, a tenant-specific virtual extensible LAN (VxLAN) is formed on a first set of tenant-specific networking hardware resources, and then, using the tenant-specific virtual extensible LAN, the orchestrator provisions a second set of tenant-specific networking hardware resources (e.g., the shown cluster network) to implement a cluster-wide interconnectivity via a cluster network 140 (operation 2). Having previously imaged the nodes (e.g., node1, node2, . . . node99) during operation 1, and having established the cluster network 140 during operation 2, an HCI storage pool 160 is configured. More specifically, since each node of the HCI cluster had already been imaged in operation 1 to have respective storage pool configuration module instances (e.g., storage pool configuration module $151_1$, storage pool configuration module $151_2$, . . . storage pool configuration module $151_{99}$) the storage pool configuration module instances of each node can interoperate to form the HCI storage pool across the HCI nodes. In the shown case, formation of the HCI storage pool relies at least in part on execution of the configuration module instances of each node. Configuration of the HCI storage pool (operation 3) may be further facilitated by the shown orchestrator module 102. The orchestrator module operates to interconnect the node-local storage devices (e.g., SD1, SD2, . . . SD99) into a contiguous address space.

To do so, and more specifically, to do so in a manner that results in a tenant-specific HCI cluster, the orchestrator creates or acquires an authenticated, tenant-specific identity and then assigns the per-tenant identity to the bare metal computing nodes. Some embodiments use the orchestrator module to configure the per-tenant identity into a hyperconverged computing infrastructure cluster monitoring module as well as to configure the per-tenant identity into any number of tenant-specific management modules. Specifically, and as shown, a monitoring module 114 may be associated with the tenant identity 107 and a first allocated IP address $115_1$, whereas a cluster management module 110 may be associated with the same tenant identity and a second allocated IP address $115_2$.

In some implementations, the orchestrator can receive and implement cluster management operations such as to add a node to the HCI cluster, or to remove a node from the HCI cluster, or to retire the cluster completely (thus ending the lifespan of the tenant's cluster). The orchestrator can implement cluster management operations completely independently from any other cluster management module, or the orchestrator can implement cluster management operations in cooperation with a cluster management module.

In some implementations, the orchestrator can implement any variation of a software-define network (SDN) using any portions of the VxLAN network and/or the cluster network. As such, each tenant of the multi-tenant datacenter 1A00 may have three separately-configurable networks: (1) the cluster network 140 (e.g., an L2 network), the tenant-specific secure network 130 (e.g., a VxLAN network), and (3) a software-defined network that is defined in accordance with software-defined network configurations 105. As used herein, the term VxLAN or VxLAN network refers to a virtual extensible local area network as detailed in IETF RFC7348. A VxLAN uses an encapsulation format that encapsulates ethernet frames in an outer UDP/IP transport.

In some situations, the tenant-specific secure network 130 may be accorded higher privileges than the cluster network 140 and, as such, the orchestrator, via the tenant-specific secure network having higher privileges, may be used to perform secure administrative functions such as adding a new node to the cluster and/or removing a node from a cluster, etc. In some cases, the tenant-specific secure network having higher privileges may be used to provision ingress/egress facilities from/to a wide area network (WAN).

As heretofore mentioned, the orchestrator module can configure instances of the individual storage pool configuration module onto the bare metal nodes, and thereafter, the individual storage pool configuration module instances can configure node-local storage resources of the bare metal nodes into a HCI storage pool. An example configuration of an HCI storage pool is shown and discussed as pertains to FIG. 1B.

Figure 1B:
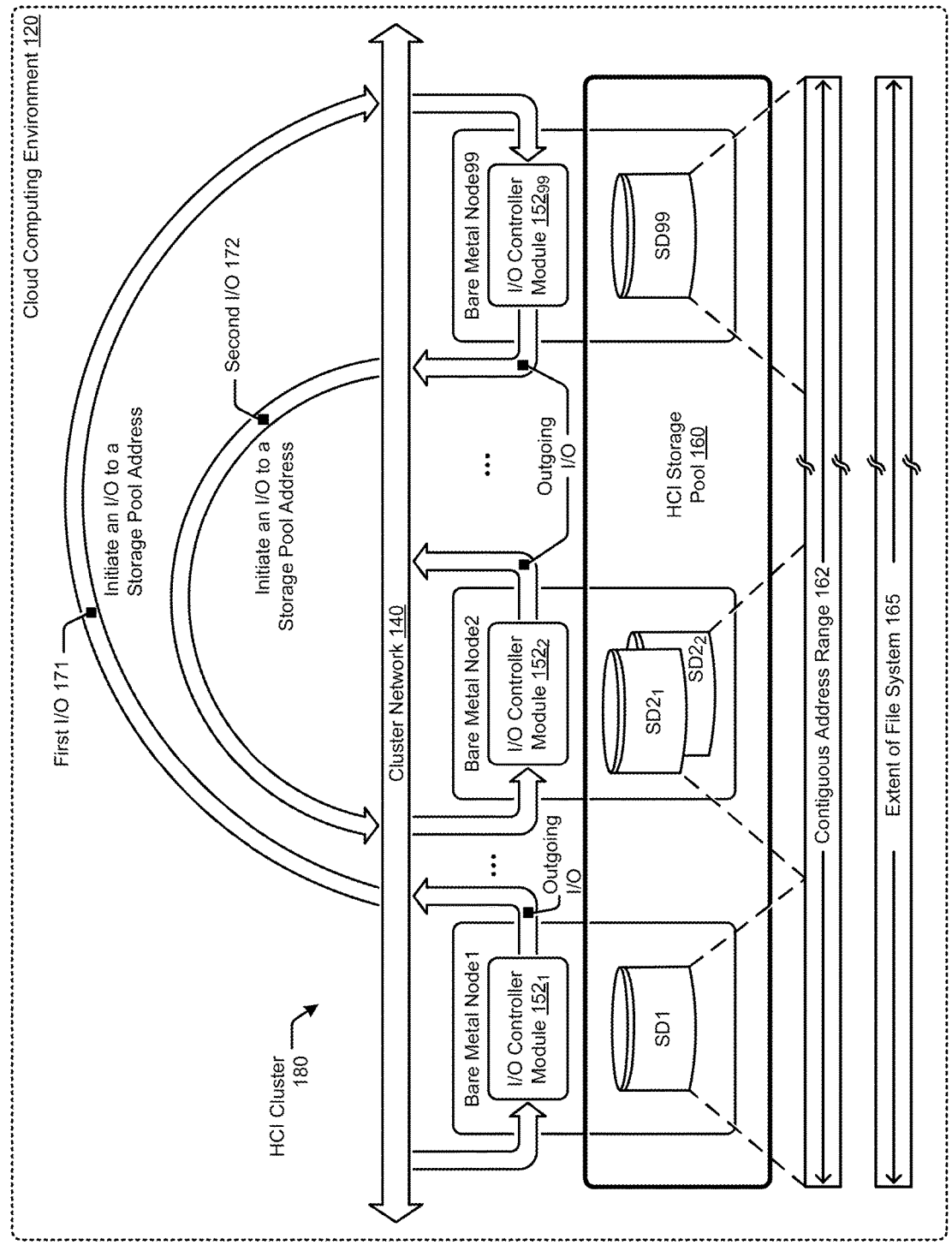
FIG. 1B show an example HCI storage pool situated in a cloud computing environment, according to an embodiment.

FIG. 1B show an example HCI storage pool situated in a cloud computing environment 120. As an option, one or more variations of the HCI storage pool or any aspect thereof may be implemented in the context of the architecture and functionality of any HCI cluster described herein and/or in any alternative environments.

The shown HCI cluster 180 includes bare metal nodes (e.g., bare metal node1, bare metal node2, . . . , bare metal node99), each of which in turn has node-local storage resources (e.g., storage device SD1, storage device $SD2_1$, $SD2_2$, . . . , storage device SD99) that are organized (e.g., concatenated) into a HCI storage pool 160. Having a contiguous address range 162, a file system can be implemented over this contiguous address range. More specifically, the extent of file system 165 can overlap the contiguous address range 162 such that any constituent (e.g., segment, block, byte) can be accessed for READ or WRITE by an address within contiguous address range 162. The individual storage pool I/O (input/output or IO) controller module instances (e.g., I/O controller module $152_1$, I/O controller module $152_2$, . . . , I/O controller module $152_{99}$) can each process incoming I/Os as well as outgoing I/Os. More specifically, incoming I/Os are processed by a node having node-local storage that corresponds to the address range of the incoming I/O. An outgoing I/O is directed to a node that has node-local storage that corresponds to the address range of the outgoing I/O. One example of such incoming and outgoing I/Os is shown by the first I/O 171 that is initiated from node1 and destined for node99. In turn, and possibly based on processing within an application running within node99, a second I/O 172 is initiated, this time destined for node2.

An HCI cluster and its storage pool can be allocated and bootstrapped based on a cluster configuration request. Monitoring and maintenance operations can be carried out on an ongoing basis. Example operation flows for responding to a cluster configuration request and for carrying out ongoing monitoring and maintenance operations are shown and described as pertains to FIG. 2.

FIG. 2 presents operation flows that facilitate allocation, bootstrapping and ongoing management of tenant-isolated, secure physical infrastructure that implements an HCI computing cluster formed from a pool of shared resources. As an option, one or more variations of the operation flows 200 or any aspect thereof may be implemented in the context of the architecture and functionality of the embodiments described herein and/or in any alternative environments.

Strictly for purposes of illustration, the operation flows can be divided into bootstrapping operations 201 and ongoing operations 211. As shown, the bootstrapping operations commence upon receiving an occurrence of a cluster configuration request 203. Receipt of such an occurrence can in turn trigger a series of steps that serve to bring up a tenant-specific HCI cluster using hardware resources available from within the cloud computing environment. When the HCI cluster to be configured is associated with a particular tenant, an authenticated tenant-specific identity can be acquired (step 202). An authenticated tenant-specific identity can be acquired from allocatable cloud computing resources of the cloud computing environment using any known technique, so long as the tenant identity is unique within the cloud computing environment.

A first secure tenant-specific network is formed using a first set of tenant-specific networking hardware resources (step 204). Such a first set of tenant-specific networking hardware resources may include IP addresses, ports of a router, VxLAN identifiers, VLAN identifiers, etc. All or portions of a first set of tenant-specific networking hardware resources are then used to allocate any number of bare metal nodes (step 206), each of which bare metal nodes are imaged with a node-specific instance of a host operating system, node-specific instances of virtualization system components (e.g., hypervisors), and node-specific instances of software modules (e.g., storage pool configuration modules, storage pool I/O controllers) which are in turn used to form, configure and operate the HCI storage pool.

Furthermore, all or portions of the first set of tenant-specific networking hardware resources are then used to provision a second set of tenant-specific networking hardware resources (step 212). The second set of tenant-specific networking hardware resources may include top-of-rack (TOR) switches and/or aggregation switches. Pairs of bare metal nodes in one rack would be interconnected at least by such a top-of-rack switch. Pairs of bare metal nodes that span across more than one rack would be interconnected at least by an aggregation switch as well as respective top-of-rack switches that are disposed in a correspondence to the number of racks involved. In some deployments, a first set of one or more racks can be interconnected at a still higher hierarchical levels to a second set of one or more racks, possibly spanning across multiple data centers over a WAN or other network connectivity that supports a subnet for the aforementioned HCI storage pool.

The bare metal nodes, being so interconnected—and being imaged as heretofore discussed—are then configured (step 214) to interoperate over a tenant-specific cluster network (e.g., a cluster network that forms a subnet facility for the aforementioned HCI storage pool). As strictly one example, IP addresses can be assigned to each of the bare metal nodes. More specifically, IP addresses can be assigned to each of the IP interfaces that are provided by the bare metal nodes. In some cases, a single bare metal node may be hardware-configured with multiple IP interfaces. In some cases, a single bare metal node may be hardware-configured with any one or more of a 40 Gbps ethernet interface, a 10 Gbps ethernet interface, a 100 Mbps ethernet interface, etc. In some cases, a single bare metal node may be hardware-configured with any one or more of RDMA NICs, and/or fiber channel host bus adapters.

As used in this and other embodiments, a bare metal node or bare metal computing node is an individually allocatable processing unit (e.g., a computer) that is initially allocated without any particular operating system software being installed. In some cases, a bare metal computing node is initially allocated and made available to the entity that allocates the node, where the allocated node has only firmware installed. An allocated bare metal node can be imaged (e.g., loaded with particular software) on demand by the entity that allocates the node.

The bare metal nodes (being imaged as heretofore discussed) are then further configured into an HCI cluster. Specifically, the HCI cluster is configured by or through operation of an orchestrator, and/or by or through operation of a node-local instance of a storage pool configuration module and/or by or through operation of a node-local instance of a storage pool I/O controller. In some situations, the node-local storage pool configuration module instances and the node-local storage pool I/O controller instances interoperate to configure the second set of tenant-specific networking hardware resources. Once the node-local storage devices so become organized (e.g., concatenated) into an HCI shared storage pool, the HCI cluster can host a workload.

Once the HCI cluster and its HCI shared storage pool have been configured, any node of the HCI cluster can host one or more executable entities (e.g., virtual machines). Any number of executable entities can be invoked on any number of nodes of the HCI cluster. On an ongoing basis, the HCI cluster is monitored (step 216) for health and other operational characteristics. On an ongoing basis, the HCI cluster may be subjected to maintenance operations (step 218). More specifically, the HCI cluster may be subjected to a maintenance operation to add a node, or the HCI cluster may be subjected to a maintenance operation to delete a node. Such maintenance operations, or at least portions thereof, can be carried out using the first set of tenant-specific networking hardware resources. This is because the first set of tenant-specific networking hardware resources has been configured to have sufficient privileges to allocate and/or release hardware resources. In certain situations, when the HCI cluster is subjected to a maintenance operation to add a node, the contiguous address range of the HCI storage pool is extended to accommodate additional node-local storage that is included in the added node.

As can now be seen, during ongoing operation, the first set of tenant-specific networking hardware resources is used for monitoring and maintenance functions over the HCI cluster, whereas the second set of tenant-specific networking hardware resources is used to implement the HCI cluster itself. In this manner the tenant, and/or any virtualized entities that are materialized under control of the tenant, can now carry out computing without demanding privileges of the first set of tenant-specific networking hardware resources.

During ongoing operation, the second set of tenant-specific networking hardware resources is in use by the HCI cluster itself for all tenant-specific functions. The second set of tenant-specific networking hardware resources can be configured for high performance layer-2 (L2) operation. A flat layer-2 network is desirable for many reasons, at least because it exhibits desirable performance characteristics, and also because a flat layer-2 network facilitates ongoing management of a highly-available HCI cluster without the use of an external load balancer.

It often happens that the second set of tenant-specific networking hardware resources are organized in a hierarchy (e.g., comprising a hierarchy of top-of-rack switches connected to an aggregation switch, etc.). This physically hierarchical network architecture can then be configured to implement an extensible, logically flat L2 network that serves as the L2 network for the storage pool. Since this extensible L2 network is implemented in hardware (e.g., by configuration of the aforementioned switches), the L2 network exhibits line rate bandwidth performance (e.g., line rate node-to-node performance) with low latency (e.g., without incurring any overlay network overhead). Certain embodiments use VXLAN with various ethernet virtual private network (EVPN) technologies to configure the flat L2 network in and across two or more top-of-rack switches so as to extend the flat L2 network to operate as a common subnet that spans across the two or more top-of-rack switches (e.g., across from a first top-of-rack switch to a second top-of-rack switch). Bootstrapping, and ongoing management of such a per-tenant, flat L2 network is shown and described as pertains to FIG. 3.

Figure 3:
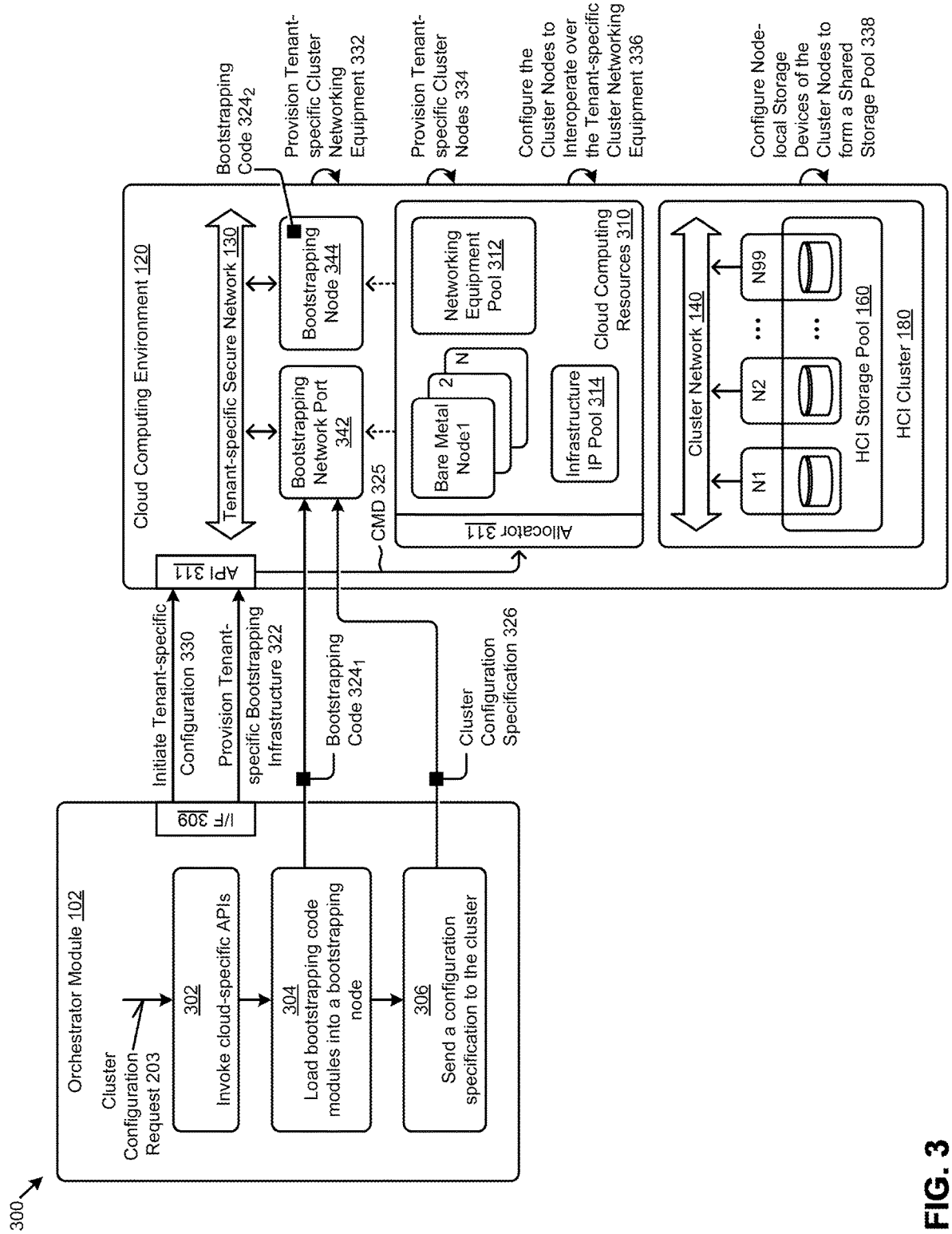
FIG. 3 shows how an orchestrator can facilitate allocation, bootstrapping and ongoing management of tenant-isolated, secure physical infrastructure to implement an HCI computing cluster, according to an embodiment.

FIG. 3 shows how an orchestrator can facilitate allocation, bootstrapping and ongoing management of tenant-isolated, secure physical infrastructure to implement an HCI computing cluster. As an option, one or more variations of the orchestrator or any aspect thereof may be implemented in the context of the architecture and functionality of the embodiments described herein and/or in any alternative environments.

As shown, orchestrator module 102 interfaces with cloud computing environment 120. The orchestrator module can be situated in any domain such that the cloud computing environment is reachable. The orchestrator performs a series of operations to bootstrap resources of the cloud computing environment. Once a sufficient set of resources of the cloud computing environment have been marshalled, the shown embodiment delivers bootstrapping code to a bootstrapping node of the cloud computing environment. The bootstrapping node then carries out provisioning operations.

Marshalling of an initial set of cloud computing resources can be carried out using any known techniques, however in the embodiment of FIG. 3, the orchestrator module allocates an initial set of cloud computing resources by invoking cloud-specific application programming interfaces (step 302). The allocated initial set of cloud computing resources can then be configured for the particular tenant for whom the HCI cluster is being configured. More specifically, and based at least in part on the cluster configuration request 203, an application programming interface (API) allocates an initial set of cloud computing resources. In the shown embodiment, API 311 is invoked over interface 309 to allocate a node (e.g., bootstrapping node 344) and at least some hardware components that comprise the aforementioned first set of tenant-specific networking hardware resources (e.g., bootstrapping network port 342). In some embodiments, the orchestrator executes on a management cluster that is separate from the to-be-configured HCI cluster. Such a management cluster can be formed of nodes that are situated in a different rack than the to-be-configured HCI cluster. Moreover, the infrastructure (e.g., node and switch infrastructure) that is used for orchestrating bring-up of the to-be-configured HCI cluster can be situated in a different underlay subnet from the subnet that is used for the to-be-configured HCI storage pool.

Additional allocation and configuration of components selected from the cloud computing resources 310 can be carried out using additional API calls and/or by using components selected from the cloud computing resources 310. In this specific embodiment, a first portion of the bring-up steps (e.g., initiating tenant-specific configuration 330 and provisioning tenant-specific bootstrapping infrastructure 322) are performed over the shown API, whereas second and Nth portions of the bring-up steps are performed by messaging over the bootstrapping network port 342.

One aspect of bring-up that is performed by messaging over the bootstrapping overlay network involves loading bootstrapping code into a bootstrapping node (step 304). As shown, this can be done by sending bootstrapping code 3241 through a bootstrapping network port 342 over tenant-specific secure network 130 to bootstrapping node 344, thus causing an instance of bootstrapping code 3242 to be invoked. The bootstrapping node itself may have been allocated in response to a command (e.g., CMD 325) that is provided to allocator 311. The allocator 311 in turn accesses a manifest of available resources taken from cloud computing resources 310, and reserves a bare metal node (e.g., bare metal nodeN), an IP address taken from an infrastructure IP pool 314, and any other networking equipment as may be needed such as provisioning of VLAN, VxLAN and per tenant SVIs to make the tenant infrastructure routable externally (e.g., networking equipment taken from networking equipment pool 312).

Another aspect of bring-up that is performed by messaging over the bootstrapping overlay network involves advising the bootstrapping node of characteristics of the to-be-configured cluster. This can be accomplished (at step 306) by sending cluster configuration specification 326 through a bootstrapping network port 342 over tenant-specific secure network 130 to bootstrapping node 344.

Now, having a bootstrapping node that is interconnected to the tenant-specific secure network 130, and having characteristics of the to-be-configured cluster loaded into the bootstrapping node, the bootstrapping code running on the bootstrapping node is able to provision tenant-specific cluster networking equipment (operation 332). Further, the bootstrapping code running on the bootstrapping node is able to provision, and image a set of tenant-specific cluster nodes (step 334). Still further, the bootstrapping code running on the bootstrapping node is able to configure the set of cluster nodes (e.g., node N1, node N2, . . . , node N99) to interoperate over the provisioned tenant-specific cluster networking equipment (operation 336).

Bootstrapping code running on the bootstrapping node is able to invoke execution of a node-specific storage pool configuration module so as to configure the node-local storage devices of the cluster nodes (operation 338) in accordance with the to-be-configured cluster specifications.

As heretofore discussed, the orchestrator module 102 accesses the cloud computing environment 120 to provision tenant-specific equipment that is then configured in accordance with a particular cluster configuration specification. Details and variations of such provisioning are given as pertains to FIG. 4A, FIG. 4B and FIG. 5.

Figure 4A:
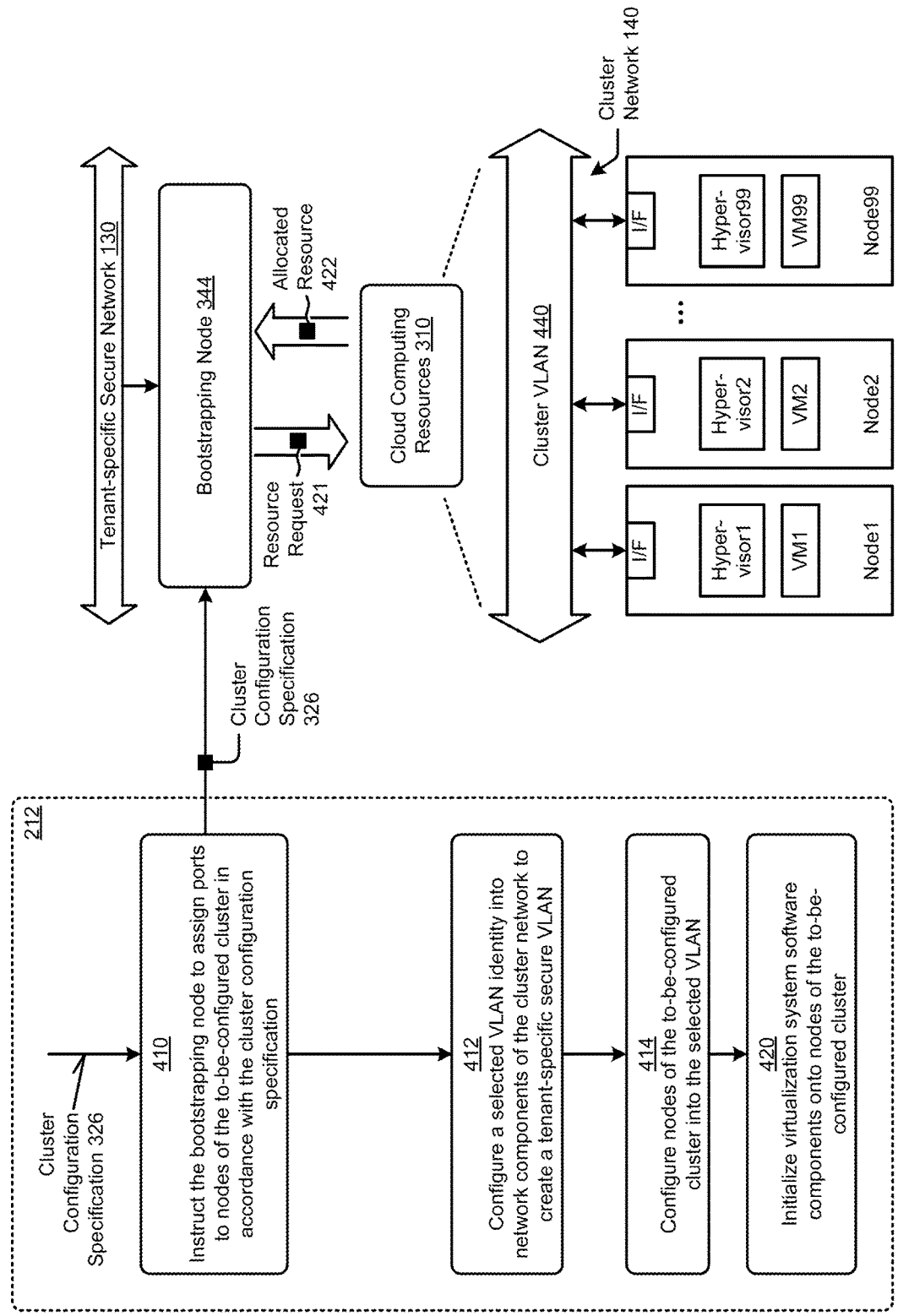
FIG. 4A presents a series of operations that facilitate provisioning of a first tenant-specific HCI cluster from a bootstrapping node, according to an embodiment.

FIG. 4A presents a series of operations that facilitate provisioning of a first tenant-specific HCI cluster from a bootstrapping node. As an option, one or more variations of the series of operations or any aspect thereof may be implemented in the context of the architecture and functionality of the embodiments described herein and/or in any alternative environments.

The presented flow is presented to disclose one possible technique for implementing step 212 of FIG. 2. More specifically, the shown flow implements one possible technique for provisioning tenant-specific networking hardware resources. Still more specifically, the shown flow implements a technique for provisioning tenant-specific networking hardware resources that form a cluster VLAN. The shown flow commences upon receipt of a cluster configuration specification 326, which specification informs how a bootstrapping node is to be instructed (step 410). More specifically, the cluster configuration specification includes sufficient information to instruct the bootstrapping node 344 to assign ports to nodes of the to-be-configured cluster in accordance with the cluster configuration specification 326. The bootstrapping node can perform to the assignments by sending a resource request 421 to allocate resources from the cloud computing resources 310. A granted resource request is indicated by a reply that includes an indication of the allocated resource 422. The allocated resource is granted to the particular tenant, and remains granted for the lifetime of the tenant-specific HCI cluster. In some cases, the resource request and allocated resource are granted by merely recording an association between a port and a node.

Once the ports have been associated with the nodes, the nodes are in a condition for assignment into a tenant-specific VLAN. Step 412 serves to select a VLAN and then to configure the ports of the cluster network 140 to operate as a cluster VLAN 440. This is shown by the interface (I/F) of each cluster node (e.g., node1, node2, node99) to be connected to the cluster VLAN 440. Step 414 carried out further configuration operations over the nodes of the cluster. Strictly as an example, certain of the node-local storage devices of each node may be designated as a storage device that is used to form the HCI storage pool, whereas others of the node-local storage devices of each node may be designated for use in a capacity other than to form an HCI storage pool.

The nodes—now being plumbed to communicate with each other over the tenant-specific cluster VLAN, and at least some of the node-local storage devices of the nodes now being designated for use to form the HCI storage pool—are in a condition for receiving virtualization software. Step 420 serves to load virtualization system software onto the nodes. In some embodiments, and as shown, the virtualization system software includes a hypervisor and any number of virtual machines (e.g., VM1, VM2, . . . , VM99). In other embodiments the virtualization system software includes any number of executable containers that implement all or portions of an HCI storage pool.

Figure 4B:
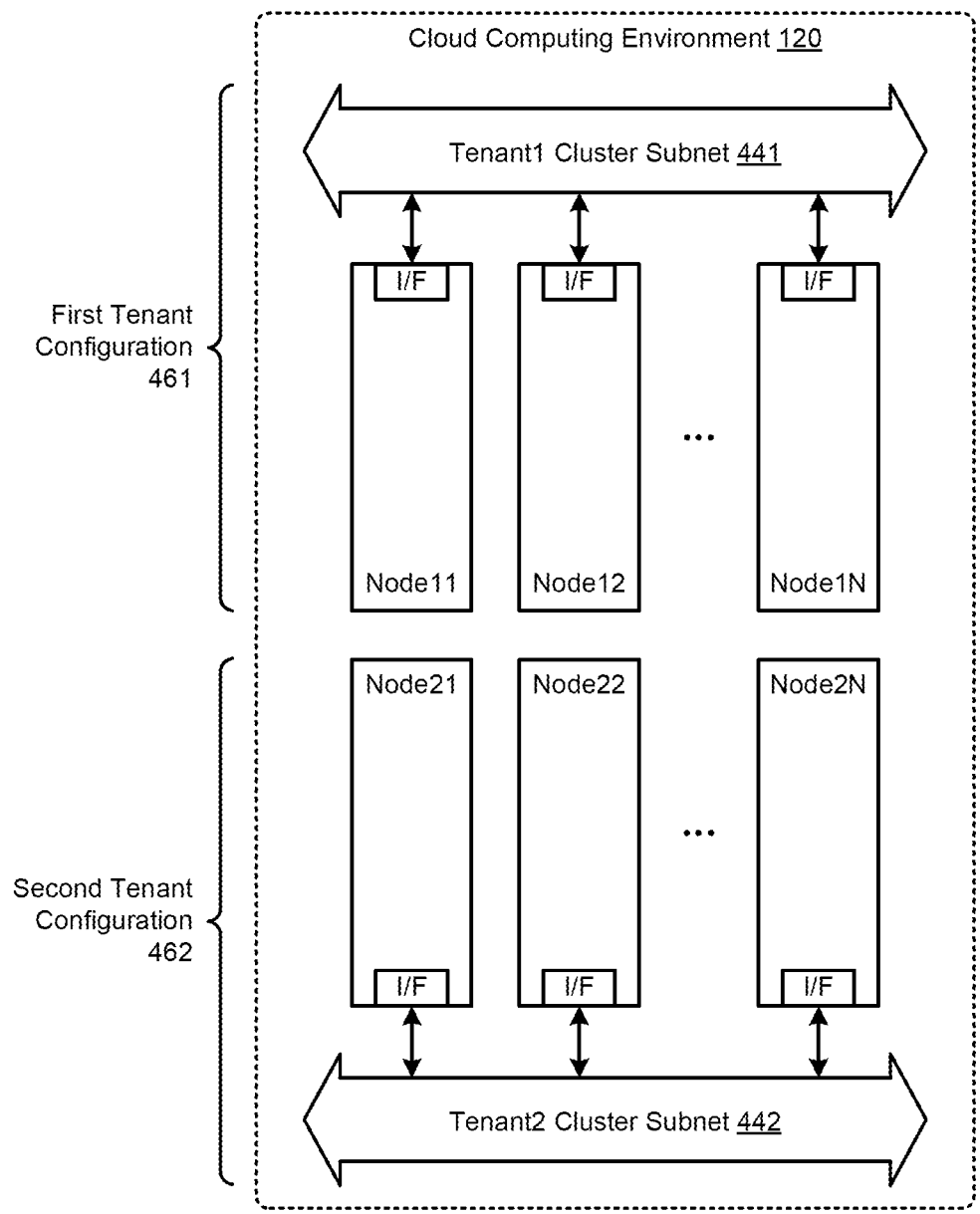
FIG. 4B presents a configuration that supports second to Nth tenant-specific HCI clusters within the same cloud computing environment, according to an embodiment.

FIG. 4B presents a configuration that supports second to Nth tenant-specific HCI clusters within the same cloud computing environment 120. As an option, one or more variations of the configuration that supports multiple tenant-specific HCI clusters or any aspect thereof may be implemented in the context of the architecture and functionality of the embodiments described herein and/or in any alternative environments.

The illustration is presented to disclose one possible technique for supporting multiple tenant-specific HCI clusters within the same cloud computing environment 120. As shown, an HCI cluster corresponding to a first tenant configuration 461 is formed from a first set of tenant-specific nodes (e.g., node11, node12, . . . node1N), whereas a second tenant configuration 462 is formed from a second set of tenant-specific nodes (e.g., node21, node22, . . . node2N). Each tenant's configuration comprises a tenant-specific HCI cluster subnet. Specifically and as shown, the first tenant configuration 461 includes tenant1 cluster subnet 441, whereas the second tenant configuration 462 includes tenant2 cluster subnet 442. As such, the two different HCI clusters of the two different tenants are logically separate and secure. Furthermore, each of the two different HCI clusters can have respective different HCI storage pools that are formed of node-local storage corresponding to the different sets of nodes that comprise the two different HCI clusters. This separation can be extended to a third tenant, a fourth tenant, through an Nth tenant such that each different tenant has its own respective HCI storage pool that does not share any cluster storage with any other tenant.

FIG. 5 presents a series of operations 500 that facilitates provisioning of an HCI storage pool from node-local storage components. As an option, one or more variations of the operation flows or any aspect thereof may be implemented in the context of the architecture and functionality of the embodiments described herein and/or in any alternative environments.

The presented flow is presented to explain one possible technique for implementing step 214 of FIG. 2. In this example embodiment, the particular range of addresses that forms the aforementioned contiguous address range 162 is determined based on the existence and specifications of node-local storage devices (step 502). For example, if each cluster node (e.g., node1, node2, . . . node99) has 1 TB of node-local usable storage, then the address can span the range [0-99T]. In some implementations, the range is expressed as a contiguous range of blocks, where each sequential address refers to a block rather than to a byte. As such, each individual address in the contiguous range can refer to a byte, or a word, or a block, or an extent, etc.

When the cluster nodes that are intended to be nodes of the HCI cluster are known, and when the existence and specifications of all of the node-local storage devices that are intended to be concatenated into the HCI storage pool 160 are gathered, then a FOR EACH loop is entered. For each cluster node, the node-level storage device(s) of the cluster node are associated with a portion of the contiguous address range 162, as shown in step 504. The association is stored in metadata that describes the HCI storage pool (step 506). When the FOR EACH loop has iterated through all of the cluster nodes the HCI cluster 180, then its constituent HCI storage pool is ready to process a workload. Step 522 serves to start the virtualization system software on each node so as to prepare the running a workload. The workload can be organized as one or more virtual machines that run on one or more of the cluster nodes. Additionally or alternatively, workload can be organized as one or more executable containers that run on one or more of the cluster nodes. In some settings, the workload is organized as a combination of virtual machines and executable containers. In some settings, the workload is able to access external storage (e.g., a storage area network (SAN) or storage server, or object storage facility, etc.) that is not part of the HCI storage pool.

System Architecture Overview

Additional System Architecture Examples

All or portions of any of the foregoing techniques can be partitioned into one or more modules and instanced within, or as, or in conjunction with a virtualized controller in a virtual computing environment. Some example instances within various virtual computing environments are shown and discussed as pertains to FIG. 6A, FIG. 6B, FIG. 6C, and FIG. 6D.

Figure 6A:
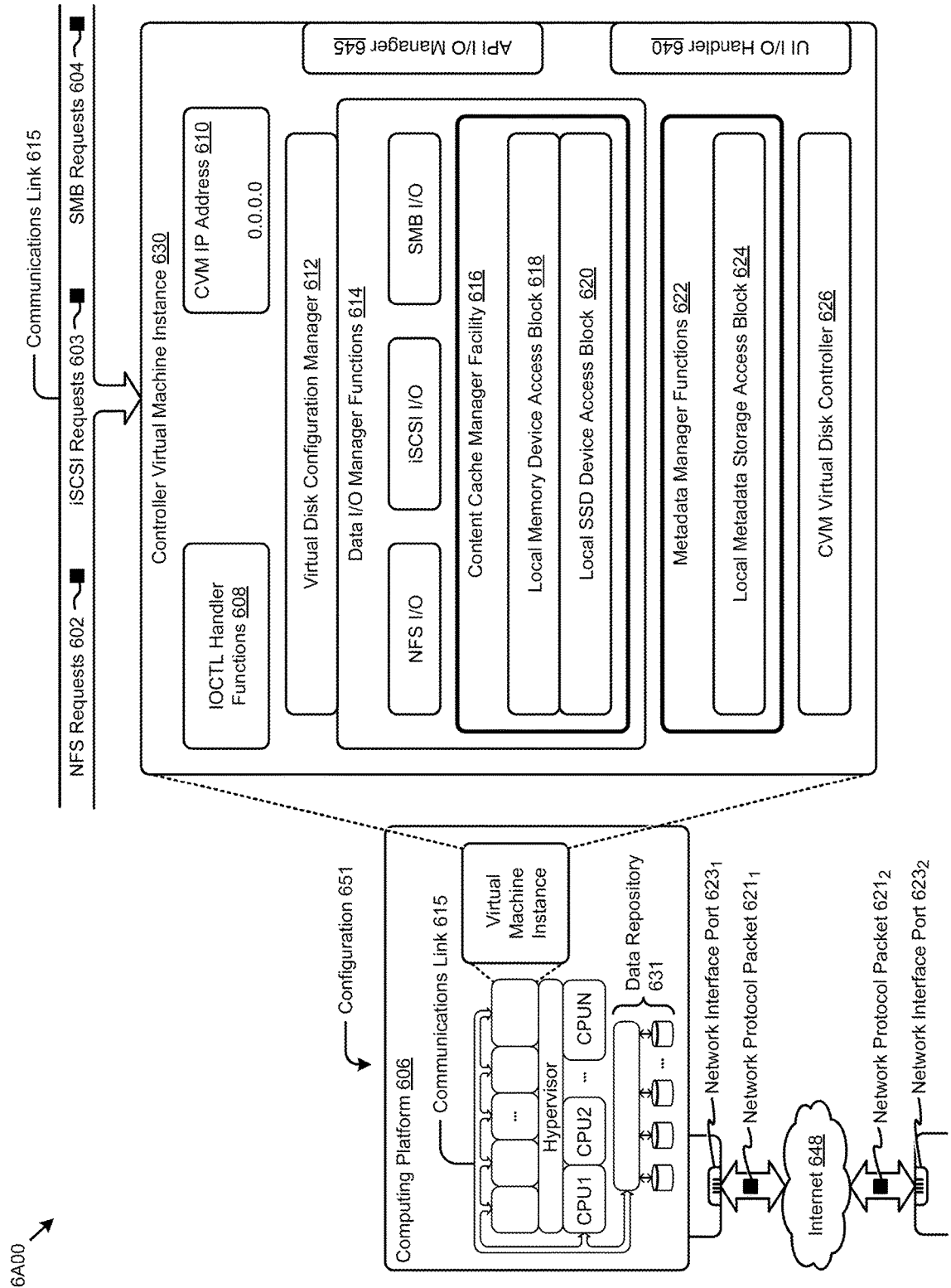
FIG. 6A, FIG. 6B, FIG. 6C, and FIG. 6D depict virtualization system architectures comprising collections of interconnected components suitable for implementing embodiments of the present disclosure and/or for use in the herein-described environments.

FIG. 6A depicts a virtualized controller as implemented in the shown virtual machine architecture 6A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 6A00 comprises a collection of interconnected components suitable for implementing embodiments of the present disclosure and/or for use in the herein-described environments. Moreover, virtual machine architecture 6A00 includes a virtual machine instance in configuration 651 that is further described as pertaining to controller virtual machine instance 630. Configuration 651 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 630.

In this and other configurations, a controller virtual machine instance receives block I/O storage requests as network file system (NFS) requests in the form of NFS requests 602, and/or internet small computer storage interface (iSCSI) block IO requests in the form of iSCSI requests 603, and/or Samba file system (SMB) requests in the form of SMB requests 604. The controller virtual machine (CVM) instance publishes and responds to an internet protocol (IP) address (e.g., CVM IP address 610). Various forms of input and output can be handled by one or more IO control handler functions (e.g., IOCTL handler functions 608) that interface to other functions such as data IO manager functions 614 and/or metadata manager functions 622. As shown, the data IO manager functions can include communication with virtual disk configuration manager 612 and/or can include direct or indirect communication with any of various block IO functions (e.g., NFS IO, iSCSI IO, SMB IO, etc.).

In addition to block IO functions, configuration 651 supports IO of any form (e.g., block IO, streaming IO, packet-based IO, HTTP traffic, etc.) through either or both of a user interface (UI) handler such as UI IO handler 640 and/or through any of a range of application programming interfaces (APIs), possibly through API IO manager 645.

Communications link 615 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 630 includes content cache manager facility 616 that accesses storage locations, possibly including local dynamic random access memory (DRAM) (e.g., through local memory device access block 618) and/or possibly including accesses to local solid state storage (e.g., through local SSD device access block 620).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 631, which in turn can be formatted into any one or more storage areas, and which can comprise parameterized storage accessible by a key (e.g., a filename, a table name, a block address, an offset address, etc.). Data repository 631 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 624. The data repository 631 can be configured using CVM virtual disk controller 626, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, CPUN). According to certain embodiments of the disclosure, two or more instances of configuration 651 can be coupled by communications link 615 (e.g., backplane, LAN, PSTN, wired or wireless network, etc.) and each instance may perform respective portions of sequences of instructions as may be required to practice embodiments of the disclosure.

The shown computing platform 606 is interconnected to the Internet 648 through one or more network interface ports (e.g., network interface port 6231 and network interface port 6232). Configuration 651 can be addressed through one or more network interface ports using an IP address. Any operational element within computing platform 606 can perform sending and receiving operations using any of a range of network protocols, possibly including network protocols that send and receive packets (e.g., network protocol packet 6211 and network protocol packet 6212).

Computing platform 606 may transmit and receive messages that can be composed of configuration data and/or any other forms of data and/or instructions organized into a data structure (e.g., communications packets). In some cases, the data structure includes program instructions (e.g., application code) communicated through the Internet 648 and/or through any one or more instances of communications link 615. Received program instructions may be processed and/or executed by a CPU as it is received and/or program instructions may be stored in any volatile or non-volatile storage for later execution. Program instructions can be transmitted via an upload (e.g., an upload from an access device over the Internet 648 to computing platform 606). Further, program instructions and/or the results of executing program instructions can be delivered to a particular user via a download (e.g., a download from computing platform 606 over the Internet 648 to an access device).

Configuration 651 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 62 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to allocating per-tenant secure physical infrastructure from a pool of shared resources of a datacenter. In some embodiments, a module may include one or more state machines and/or combinational logic used to implement or facilitate the operational and/or performance characteristics pertaining to allocating per-tenant secure physical infrastructure from a pool of shared resources of a datacenter.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of allocating per-tenant secure physical infrastructure from a pool of shared resources of a datacenter). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to allocating per-tenant secure physical infrastructure from a pool of shared resources of a datacenter, and/or for improving the way data is manipulated when performing computerized operations pertaining to provisioning a secure overlay (e.g., secure VxLAN, secure virtual local area network, etc.) before allocating infrastructure that forms the HCI cluster.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT" issued on Dec. 6, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 6B:
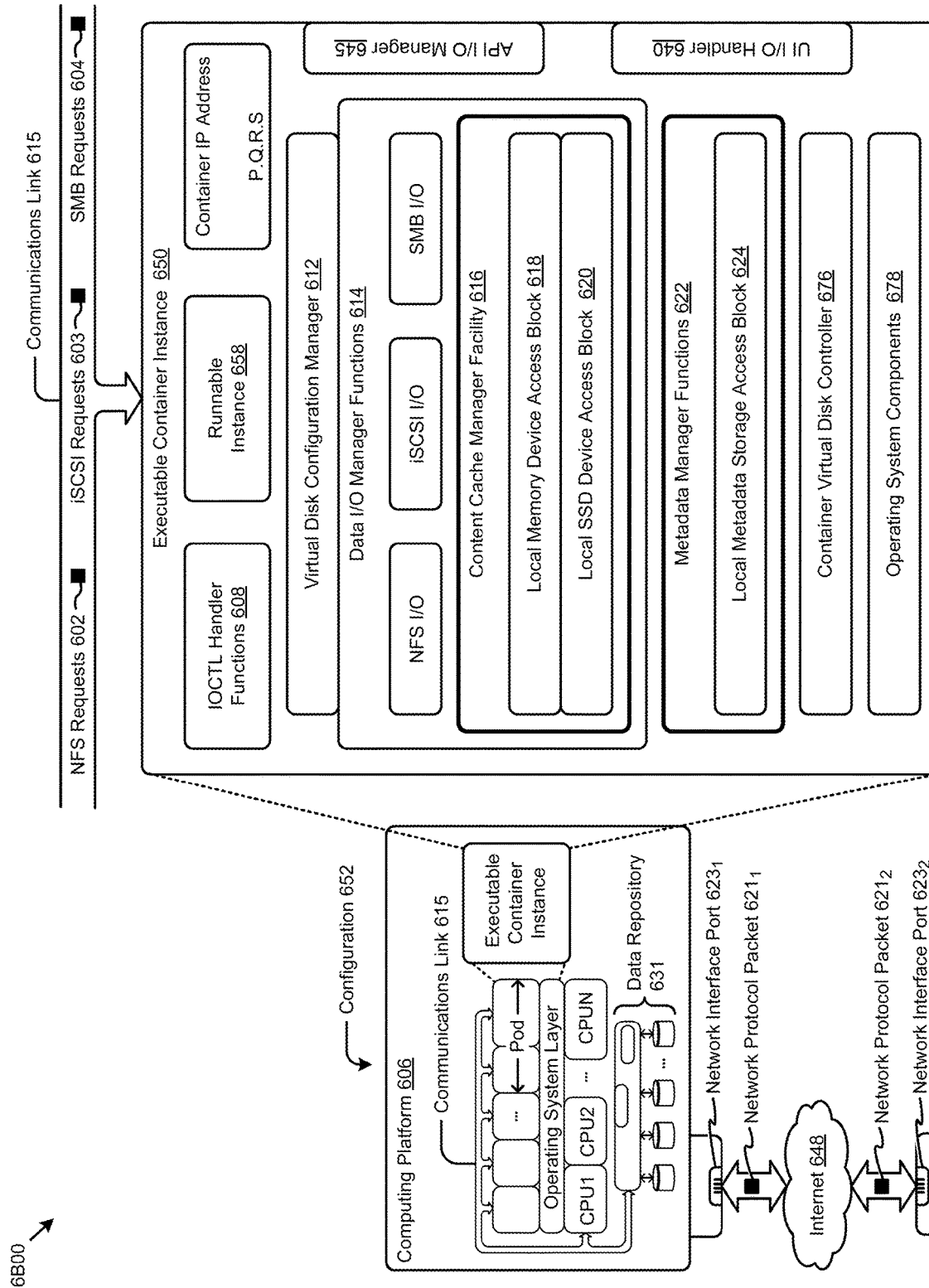

FIG. 6B depicts a virtualized controller implemented by containerized architecture 6B00. The containerized architecture comprises a collection of interconnected components suitable for implementing embodiments of the present disclosure and/or for use in the herein-described environments. Moreover, the shown containerized architecture 6B00 includes an executable container instance in configuration 652 that is further described as pertaining to executable container instance 650. Configuration 652 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 650). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls—a", etc.). The executable container might optionally include operating system components 678, however such a separate set of operating system components need not be provided. As an alternative, an executable container can include runnable instance 658, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 676. Such a container virtual disk controller can perform any of the functions that the aforementioned CVM virtual disk controller 626 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 6C:
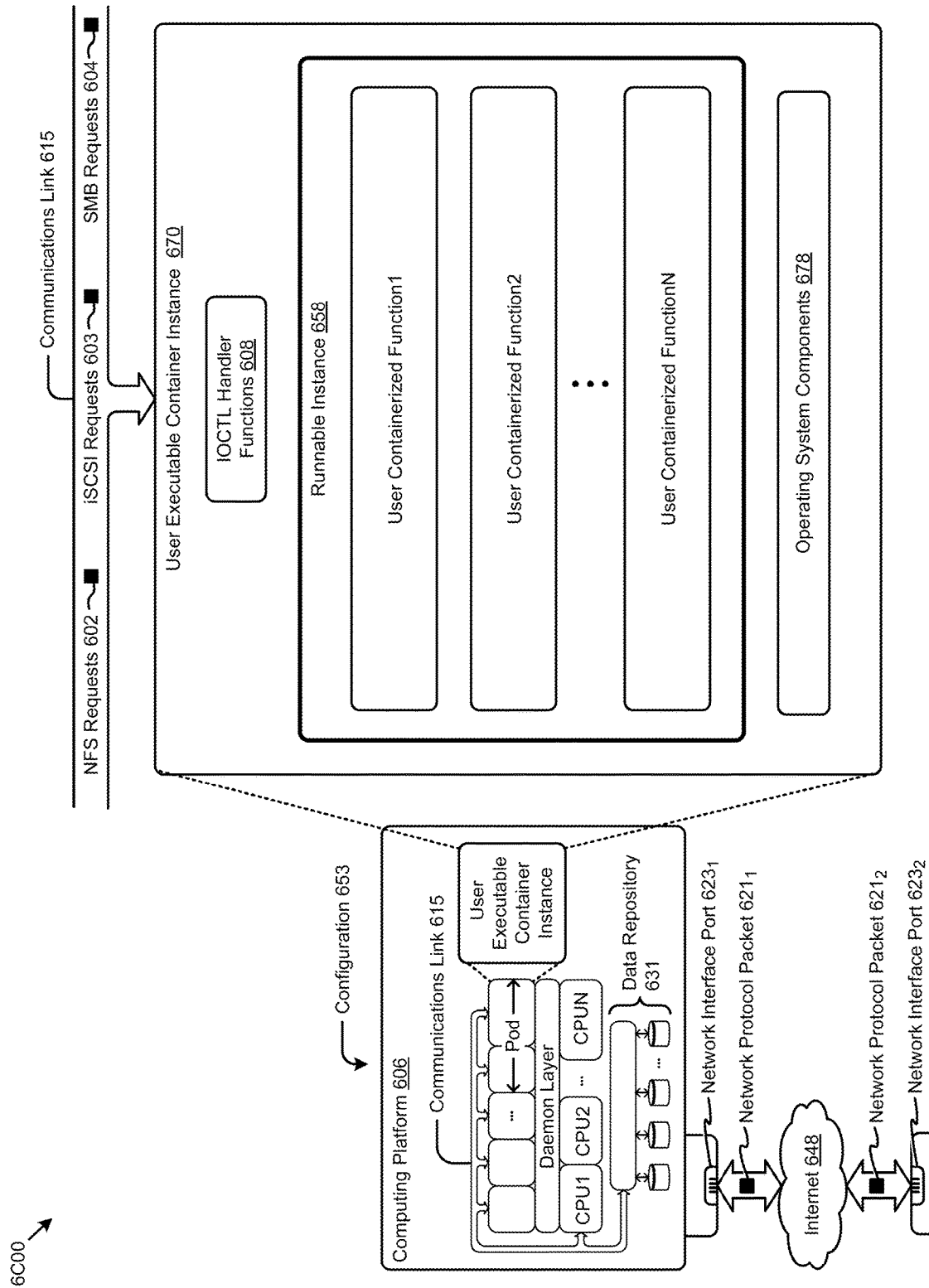

FIG. 6C depicts a virtualized controller implemented by a daemon-assisted containerized architecture 6C00. The containerized architecture comprises a collection of interconnected components suitable for implementing embodiments of the present disclosure and/or for use in the herein-described environments. Moreover, the shown daemon-assisted containerized architecture includes a user executable container instance in configuration 653 that is further described as pertaining to user executable container instance 670. Configuration 653 includes a daemon layer (as shown) that performs certain functions of an operating system.

User executable container instance 670 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 658). In some cases, the shown operating system components 678 comprise portions of an operating system, which portions are interfaced with or included in the runnable instance and/or any user containerized functions. In this embodiment of a daemon-assisted containerized architecture, the computing platform 606 might or might not host operating system components other than operating system components 678. More specifically, the shown daemon might or might not host operating system components other than operating system components 678 of user executable container instance 670.

The virtual machine architecture 6A00 of FIG. 6A and/or the containerized architecture 6B00 of FIG. 6B and/or the daemon-assisted containerized architecture 6C00 of FIG. 6C can be used in any combination to implement a distributed platform that contains multiple servers and/or nodes that manage multiple tiers of storage where the tiers of storage might be formed using the shown data repository 631 and/or any forms of network accessible storage. As such, the multiple tiers of storage may include storage that is accessible over communications link 615. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 651 of FIG. 6A) to manage the interactions between the underlying hardware and user virtual machines or containers that run client software.

Distinct from user virtual machines or user executable containers, a special controller virtual machine (e.g., as depicted by controller virtual machine instance 630) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 6D:
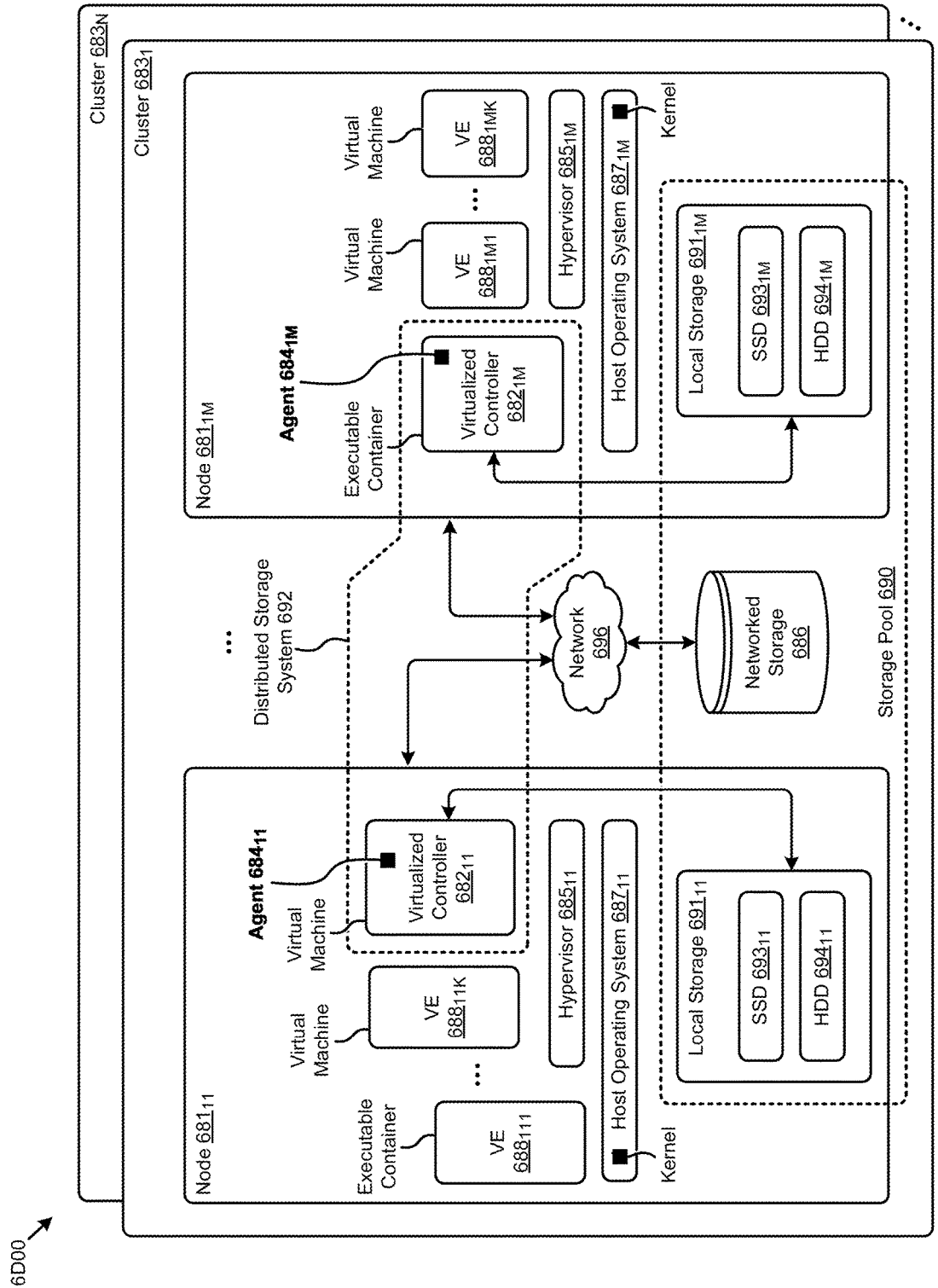

FIG. 6D depicts a distributed virtualization system in a multi-cluster environment 6D00. The shown distributed virtualization system is configured to be used to implement the herein disclosed techniques. Specifically, the distributed virtualization system of FIG. 6D comprises multiple clusters (e.g., cluster $683_1$, . . . , cluster $683_N$) comprising multiple nodes that have multiple tiers of storage in a storage pool. Representative nodes (e.g., node $681_{11}$, . . . , node $681_{1M}$) and storage pool 690 associated with cluster $683_1$ are shown. Each node can be associated with one server, multiple servers, or portions of a server. The nodes can be associated (e.g., logically and/or physically) with the clusters. As shown, the multiple tiers of storage include storage that is accessible through a network 696, such as a networked storage 686 (e.g., a storage area network or SAN, network attached storage or NAS, etc.). The multiple tiers of storage further include instances of local storage (e.g., local storage $691_{11}$, . . . , local storage $691_{1M}$). For example, the local storage can be within or directly attached to a server and/or appliance associated with the nodes. Such local storage can include solid state drives (SSD $693_{11}$, . . . , SSD $693_{1M}$), hard disk drives (HDD $694_{11}$, . . . , HDD $694_{1M}$), and/or other storage devices.

As shown, any of the nodes of the distributed virtualization system can implement one or more user virtualized entities (e.g., VE $688_{111}$, . . . , VE $688_{11K}$, . . . , VE $688_{1M1}$, . . . , VE $688_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $687_{11}$, . . . , host operating system $687_{1M}$), while the VMs run multiple applications on various respective guest operating systems. Such flexibility can be facilitated at least in part by a hypervisor (e.g., hypervisor $685_{11}$, . . . , hypervisor $685_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system $687_{11}$, . . . , host operating system $687_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 690 by the VMs and/or the executable containers.

Multiple instances of such virtualized controllers can coordinate within a cluster to form the distributed storage system 692 which can, among other operations, manage the storage pool 690. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $681_{11}$ can interface with a controller virtual machine (e.g., virtualized controller $682_{11}$) through hypervisor $685_{11}$ to access data of storage pool 690. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 692. For example, a hypervisor at one node in the distributed storage system 692 might correspond to software from a first vendor, and a hypervisor at another node in the distributed storage system 692 might correspond to a second software vendor. As another virtualized controller implementation example, executable containers can be used to implement a virtualized controller (e.g., virtualized controller $682_{1M}$) in an operating system virtualization environment at a given node. In this case, for example, the virtualized entities at node $681_{1M}$ can access the storage pool 690 by interfacing with a controller container (e.g., virtualized controller $682_{1M}$) through hypervisor $685_{1M}$ and/or the kernel of host operating system $687_{1M}$.

In certain embodiments, one or more instances of an agent can be implemented in the distributed storage system 692 to facilitate the herein disclosed techniques. Specifically, agent $684_{11}$ can be implemented in the virtualized controller $682_{11}$, and agent $684_{1M}$ can be implemented in the virtualized controller $682_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions attendant to provisioning a secure overlay before allocating infrastructure that forms the HCI cluster can be brought to bear through implementation of any one or more of the foregoing embodiments. Moreover, any aspect or aspects of securely configuring an HCI shared storage pool of an HCI cluster in a multi-tenant datacenter setting can be implemented in the context of the foregoing.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform acts comprising:
   receiving a cluster configuration request to form a hyper-converged computing infrastructure (HCI) cluster in a cloud computing environment comprising a plurality of bare metal computing nodes having node-local storage devices; and
   configuring at least some of the plurality of bare metal computing nodes to operate as the HCI cluster by:
      provisioning a tenant-specific secure network overlay formed on a first set of tenant-specific networking hardware resources;
      using the tenant-specific secure network overlay to provision a second set of tenant-specific networking hardware resources; and
      configuring the second set of tenant-specific networking hardware resources of the HCI cluster to interconnect the node-local storage devices into a shared storage pool.

2. The non-transitory computer readable medium of claim 1, further comprising instructions which, when stored in memory and executed by the processor cause the processor to perform further acts of configuring a top-of-rack switch to form a VxLAN as a network overlay formed on the first set of tenant-specific networking hardware resources.

3. The non-transitory computer readable medium of claim 1, further comprising instructions which, when stored in memory and executed by the processor cause the processor to perform further acts of configuring a first top-of-rack switch to form a layer-2 network that interconnects the plurality of bare metal computing nodes to operate as the HCI cluster.

4. The non-transitory computer readable medium of claim 3, further comprising instructions which, when stored in memory and executed by the processor cause the processor to perform further acts of configuring second top-of-rack switch using a VxLAN to extend the layer-2 network to operate as a common subnet that spans from the first top-of-rack switch to the second top-of-rack switch.

5. The non-transitory computer readable medium of claim 1, further comprising instructions which, when stored in memory and executed by the processor cause the processor to perform further acts of interconnecting the node-local storage devices into a contiguous address space.

6. The non-transitory computer readable medium of claim 1, further comprising instructions which, when stored in memory and executed by the processor cause the processor to perform further acts of assigning a tenant-specific identity to the bare metal computing nodes of the HCI cluster, wherein the tenant-specific identity is allocated from cloud computing resources of the cloud computing environment.

7. The non-transitory computer readable medium of claim 1, further comprising instructions which, when stored in memory and executed by the processor cause the processor to perform further acts of using the tenant-specific secure network overlay to provision an additional bare metal computing node into the HCI cluster.

8. The non-transitory computer readable medium of claim 1, further comprising instructions which, when stored in memory and executed by the processor cause the processor to perform further acts of loading virtualization system software onto at least one of the bare metal computing nodes.

9. A method comprising:
receiving a cluster configuration request to form a hyperconverged computing infrastructure (HCI) cluster in a cloud computing environment comprising a plurality of bare metal computing nodes having node-local storage devices; and
configuring at least some of the plurality of bare metal computing nodes to operate as the HCI cluster by:
provisioning a tenant-specific secure network overlay formed on a first set of tenant-specific networking hardware resources;
using the tenant-specific secure network overlay to provision a second set of tenant-specific networking hardware resources; and
configuring the second set of tenant-specific networking hardware resources of the HCI cluster to interconnect the node-local storage devices into a shared storage pool.

10. The method of claim 9, further comprising configuring a top-of-rack switch to form a VxLAN as a network overlay formed on the first set of tenant-specific networking hardware resources.

11. The method of claim 9, further comprising configuring a first top-of-rack switch to form a layer-2 network that interconnects the plurality of bare metal computing nodes to operate as the cluster.

12. The method of claim 11, further comprising configuring second top-of-rack switch using a VxLAN to extend the layer-2 network to operate as a common subnet that spans from the first top-of-rack switch to the second top-of-rack switch.

13. The method of claim 9, further comprising interconnecting the node-local storage devices into a contiguous address space.

14. The method of claim 9, further comprising assigning a tenant-specific identity to the bare metal computing nodes of the HCI cluster, wherein the tenant-specific identity is allocated from cloud computing resources of the cloud computing environment.

15. The method of claim 9, further comprising using the tenant-specific secure network overlay to provision an additional bare metal computing node into the HCI cluster.

16. The method of claim 9, further comprising loading virtualization system software onto at least one of the bare metal computing nodes.

17. A system comprising:
a storage medium having stored thereon a sequence of instructions; and
a processor that executes the sequence of instructions to cause the processor to perform acts comprising,
receiving a cluster configuration request to form a hyperconverged computing infrastructure (HCI) cluster in a cloud computing environment comprising a plurality of bare metal computing nodes having node-local storage devices; and
configuring at least some of the plurality of bare metal computing nodes to operate as the cluster by:
provisioning a tenant-specific secure network overlay formed on a first set of tenant-specific networking hardware resources;
using the tenant-specific secure network overlay to provision a second set of tenant-specific networking hardware resources; and
configuring the second set of tenant-specific networking hardware resources of the HCI cluster to interconnect the node-local storage devices into a shared storage pool.

18. The system of claim 17, further comprising instructions which, when stored in memory and executed by the processor cause the processor to perform further acts of configuring a top-of-rack switch to form a VxLAN as a network overlay formed on the first set of tenant-specific networking hardware resources.

19. The system of claim 17, further comprising instructions which, when stored in memory and executed by the processor cause the processor to perform further acts of configuring a first top-of-rack switch to form a layer-2 network that interconnects the plurality of bare metal computing nodes to operate as the HCI cluster.

20. The system of claim 19, further comprising instructions which, when stored in memory and executed by the processor cause the processor to perform further acts of configuring second top-of-rack switch using a VxLAN to extend the layer-2 network to operate as a common subnet that spans from the first top-of-rack switch to the second top-of-rack switch.

21. The system of claim 17, further comprising instructions which, when stored in memory and executed by the processor cause the processor to perform further acts of interconnecting the node-local storage devices into a contiguous address space.

22. The system of claim 17, further comprising instructions which, when stored in memory and executed by the processor cause the processor to perform further acts of assigning a tenant-specific identity to the bare metal computing nodes of the HCI cluster, wherein the tenant-specific identity is allocated from cloud computing resources of the cloud computing environment.

23. The system of claim 17, further comprising instructions which, when stored in memory and executed by the processor cause the processor to perform further acts of using the tenant-specific secure network overlay to provision an additional bare metal computing node into the HCI cluster.

24. The system of claim 17, further comprising instructions which, when stored in memory and executed by the processor cause the processor to perform further acts of loading virtualization system software onto at least one of the bare metal computing nodes.

\* \* \* \* \*